United States Patent [19]

Depperman et al.

[11] Patent Number: 5,094,435
[45] Date of Patent: Mar. 10, 1992

[54] FLANGE ALIGNMENT TOOL AND METHOD

[75] Inventors: Warren B. Depperman, Lugoff; William J. Westerman, Columbia, both of S.C.; Timothy C. Dearman, Shreveport, La.

[73] Assignee: Cogsdill Tool Products, Inc., Camden, S.C.

[21] Appl. No.: 612,215

[22] Filed: Nov. 9, 1990

[51] Int. Cl.$^5$ .............................................. B25B 1/00
[52] U.S. Cl. ............................................ 269/43; 269/47
[58] Field of Search ............ 269/37, 43, 45, 152–156, 269/130, 131, 287, 47, 52; 29/272; 228/49, 3

[56] References Cited

U.S. PATENT DOCUMENTS

| | | | |
|---|---|---|---|
| 1,323,127 | 11/1919 | Treuthardt | 269/45 |
| 1,446,811 | 2/1923 | Rowland | 269/45 |
| 1,781,997 | 11/1930 | Berezowski . | |
| 3,400,872 | 9/1968 | Rogers . | |
| 3,422,519 | 1/1969 | Fehlman . | |
| 3,467,295 | 9/1969 | Watson . | |
| 3,666,159 | 5/1972 | Watson . | |
| 3,854,712 | 12/1974 | McGee . | |
| 3,898,714 | 8/1975 | McFadden . | |
| 3,901,497 | 8/1975 | Dearman . | |
| 3,952,936 | 4/1976 | Dearman . | |
| 4,195,828 | 4/1980 | Peterson . | |
| 4,467,955 | 8/1984 | Maupin, Jr. . | |
| 4,674,730 | 6/1987 | Roberts . | |
| 4,712,779 | 12/1987 | Dearman . | |
| 4,753,425 | 6/1988 | Yang | 269/45 |
| 4,962,918 | 10/1990 | Yang | 269/156 |

Primary Examiner—Robert C. Watson
Attorney, Agent, or Firm—Harness, Dickey & Pierce

[57] ABSTRACT

A flange alignment tool for temporarily aligning and holding a flange of a workpiece in concentric alignment with a tubular workpiece such as a pipe. The tool includes a C-shaped frame member having integrally formed first and second opposing end portions, a transverse frame section extending between the first and second opposing end portions, and an elongated base portion extending outwardly from the second end portion. The first opposing end portion, transverse frame section, and base portion each contain threaded apertures and associated, manually adjustable alignment screws. The tool is secured to a flange by placing it over an outer edge portion of the flange with an outer surface of the flange abuttingly engaging the second opposing end portion of the C-shaped frame member. The alignment screw of the first opposing end portion is then manually screwed into contact with an inner surface of the flange to secure the C-shaped frame member securely thereto. The alignment screw of the transverse frame section is also screwed into contact with the outer edge portion of the flange to further secure the C-shaped frame member relative to the flange. The alignment screw of the base portion is then controllably screwed into abutting contact with an outer surface of the pipe to thereby controllably position the C-shaped frame member and the flange clamped thereto concentrically with the pipe. The flange alignment tool may also be used in cooperation with a chain clamp and a level and support device to further enhance the ease with which the flange may be aligned with the pipe.

19 Claims, 3 Drawing Sheets

FLANGE ALIGNMENT TOOL AND METHOD

BACKGROUND OF THE INVENTION

1. Technical Field

This invention relates generally to a clamping apparatus, and more particularly to a flange alignment apparatus for temporarily and controllably aligning a flange with a workpiece and supporting the flange in a desired position relative to the workpiece while the flange is being permanently attached to the workpiece, such as by welding.

2. Discussion

Various tools have been devised over the years in an attempt to permit one workpiece to be temporarily aligned with a mating workpiece while the two workpieces are fixedly secured together such as by welding. Such devices have suffered from various drawbacks in that they do not permit quick, easy, efficient, accurate, and/or temporary alignment of the two workpieces while the workpieces are being permanently secured together.

Another disadvantage of previously developed tools is an inability to be used with two workpieces, where one of the workpieces contains a curved or angled portion near its end. For example, where a flange is to be secured to an elbow section of a pipe, many such previously developed alignment tools are wholly unsuited for supporting the flange relative to the workpiece without the use of several additional, and often expensive, clamping devices. Furthermore, many previously developed clamping devices are unsuited to work in cooperation with other clamping devices.

It is therefore a principal object of the present invention to provide a flange alignment tool which is capable of being removably and temporarily affixed to a flange, and which is further operable to selectively and controllably align the flange to a desired position relative to a mating workpiece, such as a pipe, to be affixed to the flange, and to hold the flange stationary in a secure and accurate manner while it is being permanently attached to its mating workpiece.

It is a further object of the present invention to provide a flange alignment tool which is capable of aligning and holding in alignment a flange with a mating workpiece, such as a pipe, without the aid of any other clamping mechanism or support device.

It is still a further object of the present invention to provide a flange alignment tool which is capable of aligning and holding in alignment a flange with a mating workpiece, such as a pipe, and which may be readily used in cooperation with other flange alignment and support devices to further enhance the ease with which workpieces may be aligned and temporarily supported during welding, brazing and other like operations.

It is another object of the present invention to provide a flange alignment tool which is capable of aligning and supporting a flange with a mating workpiece, such as a pipe, where the pipe is shaped in the form of an elbow.

It is still a further object of the present invention to provide a flange alignment tool which may be used to align and support a flange to a mating workpiece, such as a pipe, while the flange and mating workpiece are secured together by welding or brazing, without interfering with the welding or brazing operation.

SUMMARY OF THE INVENTION

The above and other objects are provided by a flange alignment tool in accordance with the present invention. The flange alignment tool generally comprises a C-shaped frame member having first and second opposing end surfaces, a transverse frame section extending between and connecting the first and second opposing end portions, and an elongated base portion extending outwardly from the second end portion. The first opposing end portion, transverse frame section and base portion of the C-shaped frame member each include an aperture therethrough. The apertures are threaded and each receives a threaded, adjustable alignment screw. In a preferred embodiment of the invention each alignment screw further includes an elongated handle portion coupled thereto to facilitate easy and comfortable manual rotation of its associated alignment screw.

To use the flange alignment apparatus in aligning and supporting a flange with a mating workpiece, such as a pipe, the C-shaped frame member is placed over an outer edge portion of the flange with the second opposing end portion in abutting engagement with an outer surface of the flange. The alignment screw associated with the first end portion is then screwed inwardly towards the opposing second end portion until it abuttingly engages an inner surface of the flange. The alignment screw associated with the transverse frame section is then screwed inwardly towards and into abutting contact with the outer edge portion of the flange. The flange may then be alignably positioned relative to its mating workpiece and held stationary while the alignment screw associated with the base portion of the C-shaped frame member is threadably screwed into abutting contact with an outer surface of the mating workpiece. The flange alignment tool then operates to maintain the flange in its set position while the flange is permanently affixed to its mating workpiece such as by welding, brazing, etc.

In a preferred embodiment of the invention, the flange alignment tool may be used cooperatively with other alignment and support devices if so desired. For example, the flange alignment tool may be used in connection with conventional chain clamp and level support devices to further increase the ease with which a flange may be positioned and held with respect to another workpiece, if an application so requires.

BRIEF DESCRIPTION OF THE DRAWINGS

The various advantages of the present invention will become apparent to one skilled in the art by reading the following specification and subjoined claims and by referencing the following drawings in which:

FIG. 5 is an illustration showing a plurality of flange alignment tools being employed to concentrically align and hold in alignment a flange with an elbow portion of a pipe without the aid of a conventional level and support device and conventional chain clamp.

DETAILED DESCRIPTION OF THE PREFERRED EMBODIMENTS

Figure 1:
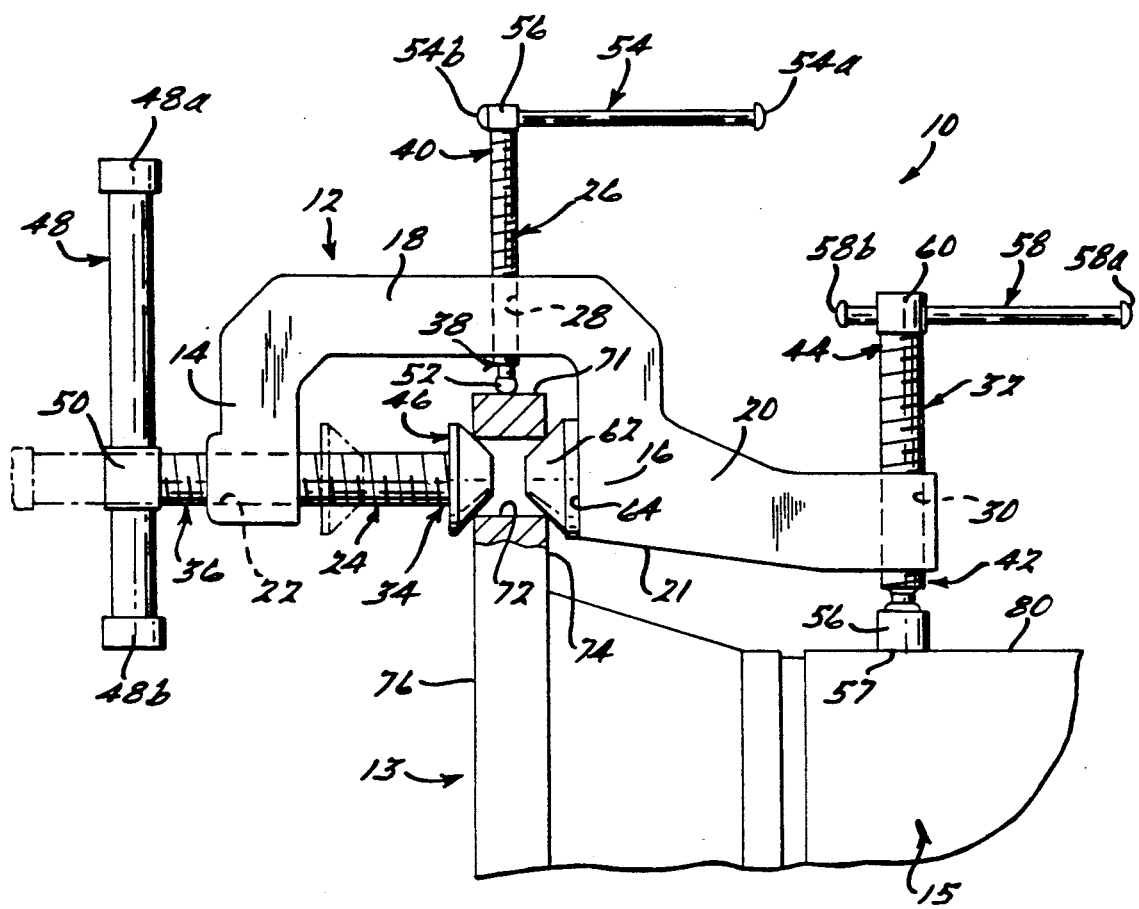
FIG. 1 is a side elevational view of a flange alignment tool in accordance with the present invention showing the tool as it may be secured to a flange and adjusted to temporarily hold the flange in a predetermined position relative to a mating workpiece such as a pipe.

Referring to FIG. there is shown a C-shaped flange alignment tool 10 in accordance with the present invention. Also shown to help illustrate the operation of the alignment tool 10 is a flange 13 shown in concentric alignment with a pipe 15.

The C-shaped flange alignment tool 10 generally comprises a C-shaped frame member 12 having integrally formed first and second opposing end portions 14 and 16 respectively, a transverse frame section 18, and an elongated base portion 20. Base portion 20 includes an angled portion 21 which helps to provide clearance between base portion 20 and the flange 13 when the alignment tool 10 is secured to the flange 13. The first opposing end portion 14 of the C-shaped frame member 18 further includes an apertured portion, as indicated by dashed lines 22, with the apertured portion 22 being threaded to threadably receive therethrough a first adjustable, threaded alignment screw 24. The transverse frame section 18 includes a second, adjustable, threaded alignment screw 26 extending through a threaded, apertured portion, indicated by dashed lines 28. The base portion 20 similarly includes a threaded, apertured portion, indicated by dashed lines 30, operable to receive a third, adjustable, threaded alignment screw 32 therethrough.

The first alignment screw 24 includes an inner end 34 and an outer end 36. The second alignment screw 26 similarly includes an inner end 38 and an outer end 40, and the third alignment screw 32 also has an inner end 42 and an outer end 44. In a preferred embodiment of the present invention the first alignment screw 24 further includes a tapered alignment plug 46 secured to its inner end 34 in a well known, conventional, rotatably captive manner to enable the alignment screw 24 to rotate while the alignment plug 46 remains stationary.

The outer end 36 of first alignment screw 24 further comprises a captively held, elongated handle portion 48 having end portions 48A and 48B. The handle portion 48 is adapted to slide through an apertured head portion 50, where the head portion 50 is preferably integrally formed with the outer end portion 36 of first alignment screw 24. The opposing ends 48A and 48B of elongated handle portion 48 are slightly larger in diameter then the remainder of handle portion 48 to thereby prevent handle portion 48 from sliding out of head portion 50 while the tool 10 is in use.

In the preferred embodiment of the present invention the second alignment screw 26 further comprises a semi-spherical portion 52 integrally formed with its inner end 38. It should be appreciated, however, that semi-spherical portion 52 could be substituted for a flat portion of a particular application required, or could just as easily be substituted for a wide variety of other shapes.

Further operatively associated with alignment screw 26 is an elongated handle portion 54 is also included and extends through an integrally formed head portion 56 of the alignment screw 26. Elongated handle portion 54 further includes enlarged end portions 54A and 54B which also prevent it from becoming detached from the second alignment screw 26.

Finally, the third alignment screw 32 includes a generally flat mounting member 56 having a flat surface 57. The mounting member 56 is conventionally secured in a captive, rotatable fashion to the inner end 42 of the third alignment screw 32. An elongated handle portion 58 having ends 58A and 58B is also included which is operable to slide through an apertured head portion 60 integrally formed with the outer end 44 of third alignment screw 32. Both ends 58A and 58B are further enlarged slightly to prevent elongated handle portion 58 from becoming detached from the third alignment screw 32.

In a preferred embodiment of the present invention the flange alignment tool 10 further includes a tapered alignment plug 62. The alignment plug 62 is securely affixed to an inside edge portion 64 of the second opposing end portion 16 of C-shaped frame member 12. Although this feature is optional, it should be appreciated that tapered alignment plug 62 increases the ease with which the C-shaped frame member 12 may be coupled to the flange 13.

Figure 2:
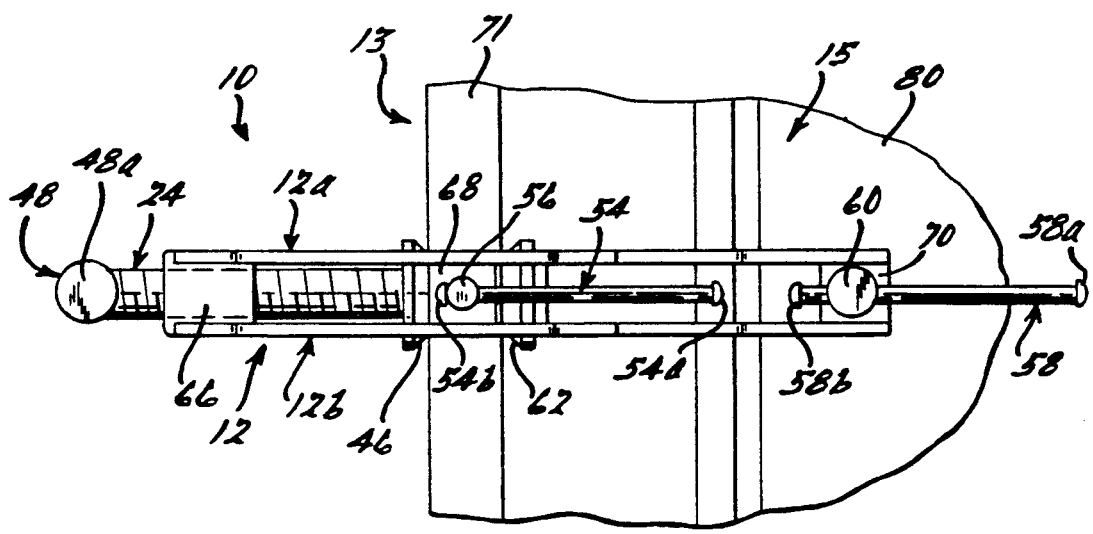
FIG. 2 is an elevational plan view of the flange alignment tool as it secures a flange in alignment with a pipe.

Referring now to FIG. 2, the preferred construction of the C-shaped frame member 12 can be seen more clearly. C-shaped frame member 12 generally comprises frame plates 12A and 12B disposed in parallel alignment with one another. The frame plates 12A and 12B are each coupled together via a plurality of adjustment support blocks 66, 68 and 70, preferably by welding, brazing or other like methods of attachment, to form an integral, rigid, structurally strong frame portion. To add still further rigidity, alignment plug 62 is also fixedly secured inbetween the frame plates 12A and 12B preferably by welding. The welding of adjustment support blocks 66, 68 and 70 and tapered alignment plug 62 to frame plates 12A and 12B thus serves to produce a structurally strong rigid frame portion which can be used to fixedly clamp and hold flange 13 at a predetermined position relative to pipe 15.

The various components of the system 10 may be manufactured from a wide variety of structurally rigid materials such as steel, cast iron, or aluminum. The incorporation of frame plates 12A and 12B rather than using a single, solid block of material also further helps to reduce the weight of the tool 10. It should be appreciated, however, that tool 10 could be formed from a single piece of material such as by forging if so desired.

With reference now to FIGS. 1 and 2, a description of the method of using the alignment tool 10 will be provided. Initially, the C-shaped frame member 12 is placed over an outer edge portion 71 of the flange 13. The tapered alignment plug 62 associated with second opposing end portion 16 is then inserted into a hole 72 drilled through a portion of the flange 13, and in abutting contact with an outer surface 74 of the flange 13 near its outer perimeter. It should be understood immediately, however, that the alignment tool 10 may also be used to clamp flanges that have no holes near their outer peripheries. However, inclusion of a hole such as hole 72 within flange 13 further helps to insure that secure clamping of flange 13 is effected by the alignment tool 10.

While the C-shaped frame member 18 is held so as to maintain the alignment plug 62 in secure abutting contact with outer surface 74, elongated handle portion 48 may be rotated to controllably and threadably screw alignment screw 24 towards an inner surface 76 of the flange until tapered alignment plug 46 abuttingly engages aperture 72 and inner surface 76 of flange 13.

While tapered alignment 46 is securely abuttingly engaging inner surface 76 and aperture 72 of flange 13, elongated handle portion 54 may be rotated to threadably and controllably cause second alignment screw 26 to be moved towards the outer edge portion 71 of flange 13 until semi-spherical end portion 52 abuttingly engages the outer edge portion 71. At this point, second alignment screw 26 operates to help hold the C-shaped frame member 12 in a fixed position extending radially outward of the flange 13. The flange 13 is then positioned at a desired location relative to the pipe 15 and elongated handle portion 58 is controllably rotated to threadably screw the third alignment screw 32 towards pipe 15 until the flat surface 57 of mounting member 56 is in abutting contact with an outer surface 80 of the pipe 15. At this point, the flange 13 will be held securely in a desired position relative to the pipe 15 until flange 13 can be welded, brazed or otherwise permanently secured to pipe 15.

It should be appreciated that the flange alignment tool 10 of the present invention may be used to hold a flange or other similarly shaped part at a wide variety of positions with respect to an associated workpiece such as pipe 15. For example, the flange alignment tool 10 is capable of aligning flange 13 and pipe 15 concentrically with each other or in a non-concentric arrangement if so required by a particular application.

Figure 3:
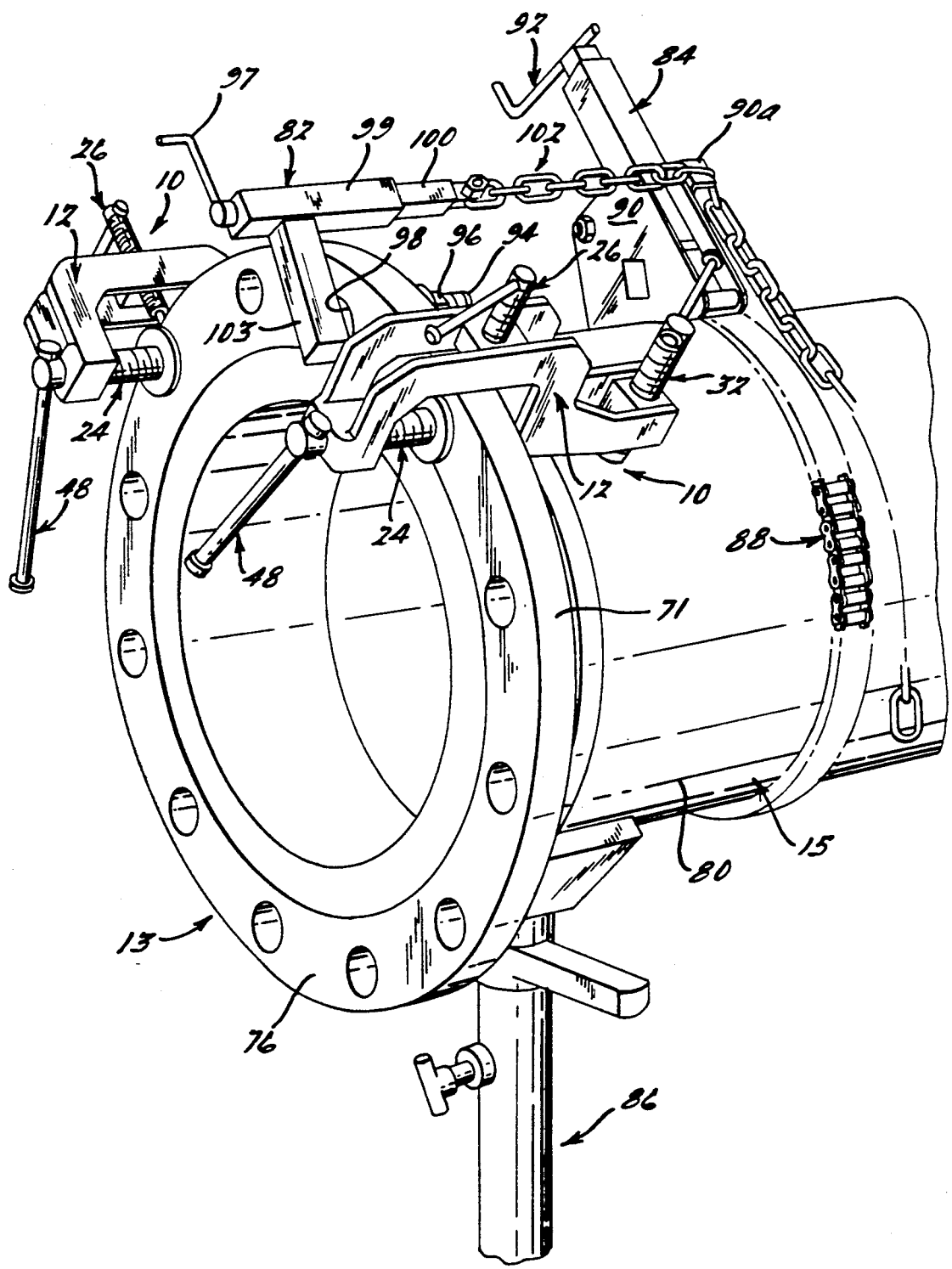
FIG. 3 is an illustration of a plurality of flange alignment tools being employed to accurately align and maintain a flange in concentric alignment with a pipe, where the flange alignment tools are used in connection with a conventional level and support device and conventional chain clamp.
Figure 3:
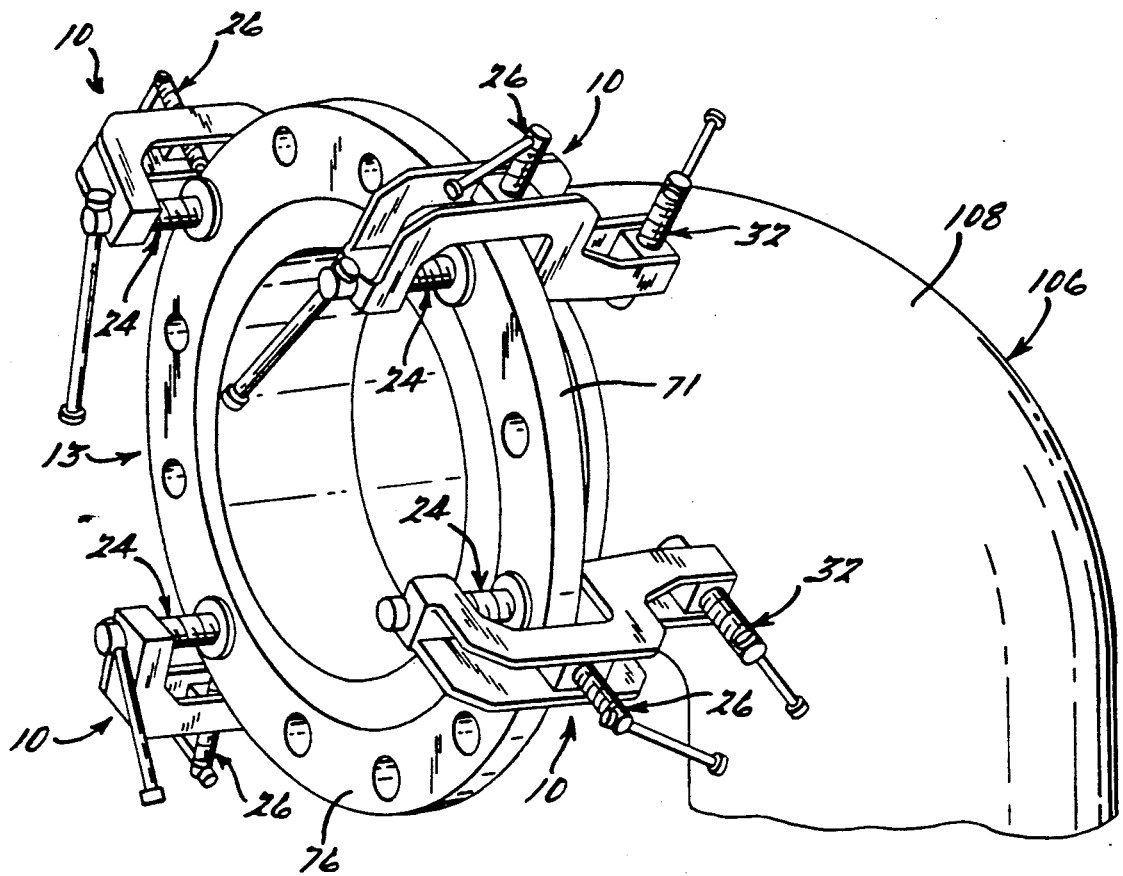

Referring now to FIG. 3, it can be seen how a plurality of flange alignment tools 10 of the present invention can be used in cooperation with a conventional level and support device 82 (also shown in detail in FIG. 4) and a conventional chain clamp 84 to concentrically align and maintain in concentric alignment the flange 13 and pipe 15 to enable the flange 13 to be secure to the pipe 15. Initially, pipe 15 may be supported by a jackstand 86, although it should be appreciated that a jackstand may not be required in all applications if pipe 15 and flange 13 are relatively small and light in weight, and may thus be held above ground manually by an individual.

A chain section 88 of chain clamp 84 is wrapped around the outer periphery of pipe 15 to completely circumscribe the outer periphery of the pipe 15. Chain clamp 84 includes a conventional and well known tensioning mechanism 90, which includes a shoulder portion 90A and an adjustment lever 92. When adjustment lever 92 is rotated it causes tensioning mechanism 90 to draw in the chain section 88 to thereby pull chain section 88 taut against the outer periphery of pipe 15. Chain section 88 will then be secured tightly around pipe 15 and maintained in a tight, relatively non-slip fashion relative to pipe 15.

Figure 4:
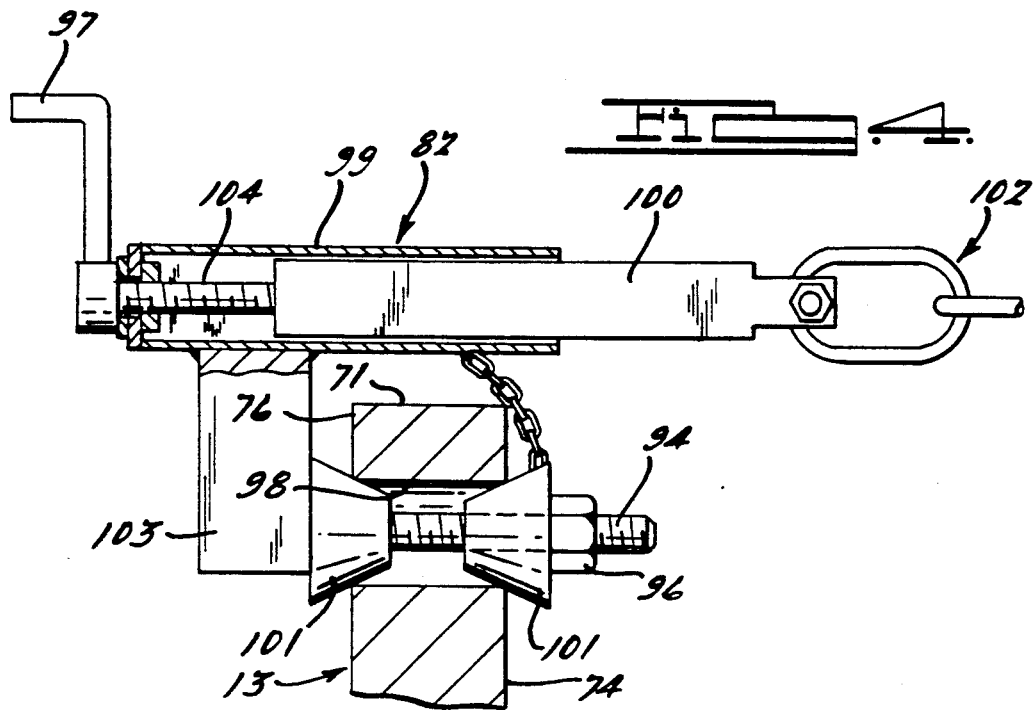
FIG. 4 is an illustration of a conventional level and support device which may be used in cooperation with the flange alignment tool to further help ease the task of aligning a flange and holding the flange in alignment with a mating workpiece, such as a pipe.

With reference now to FIGS. 3 and 4, a description of the construction of level and support device 82 will be provided. The level and support device 82 includes a threaded bolt 94, a mating nut 96, a crank handle 97, a main housing 99, a piston 100, a releasably secured section of coil resistant chain 102, and a threaded rod 104 secured to the crank handle 97. Bolt 94 is secured to the main housing 99 via a laterally extending portion 103. Optional tapered alignment plugs 101 may also be included to help secure device 82 to the flange 13.

The level and support device 82 is attached to flange 13 by placing bolt 94 thereof through an aperture 98 of the flange 13 and securing the level and support device 82 to flange 13 by nut 96. A portion of coil resistant chain 102 is then secured to shoulder portion 90A.

To initially move the flange 13 into approximate alignment with pipe 15, the crank handle 97 is turned to provide tension to chain length 102 to thereby draw the flange 13 into approximate, concentric alignment with pipe 15. Next, the alignment tools 10 may be secured to the flange 13 as described in connection with the discussion of FIGS. 1 and 2. Once securely clamped to flange 13, the C-shaped frame member 12 of each alignment tool 10 may be moved towards or away from the outer surface 80 of pipe 15 by screwing alignment screws 32 towards and into abutting contact with the outer surface 80 of pipe 15.

It should also be appreciated that while two flange alignment tools 10 have been illustrated working cooperatively to align flange 13 to pipe 15, a single flange alignment tool 10 could conceivably be used in certain limited applications to align flange 13 and pipe 15. FIG. 3, however, helps illustrate how two flange alignment tools 10 may be employed to work cooperatively with each other and with other conventional components to further enable easier, more convenient, and more accurate alignment of a flange with a mating workpiece.

Referring now to FIG. 5, a plurality of flange alignment tools 10 are illustrated holding flange 13 in concentric alignment with a pipe 106 having an elbow section 108. Those skilled in the art, of course, would utilize appropriate additional supports for the work prior to clamping and during the welding operation. Those skilled in the art will realize, however, that appropriate additional supports, like those illustrated in FIG. 3, will in most applications be needed to assist in the alignment and clamping processes, and during welding operations.

Employing a plurality of flange alignment tools 10 enables flange 13 to be securely aligned and supported relative to pipe 106, where a level and support device 82 and chain clamp 84 could not be readily employed to assist in aligning flange 13. Accordingly, flange alignment tool 10 is useful in enabling quick and accurate alignment of a flange with a workpiece where the shape of the workpiece makes it inconvenient, impractical or impossible to assist the alignment with the use of a conventional chain clamp and level and support device.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:
1. A flange alignment tool comprising:
  a C-shaped frame member having first and second opposing end portions, a frame section transverse to said first and second end portions and extending between said first and second end portions, and an elongated base portion extending generally transversely from said first end portion and in general co-planar alignment with said first end portion;
  said first end portion, said transverse frame section and said base portion each being apertured therethrough;

said C-shaped frame member being operable to be placed over a flange having inner and outer surfaces and an outer edge portion, whereby said first and second opposing end portions are facing said inner and outer surfaces of said flange and said base portion is extending generally parallel to a surface of a mating workpiece;

first adjustable alignment means for extending through said apertured portion of said first end portion and engaging said inner surface of said flange and helping to align and hold said flange securely between said first and second opposing end portions of said C-shaped frame member;

second adjustable alignment means operable to extend through said apertured portion of said transverse frame section for engaging said outer edge portion of said flange and fixedly securing said transverse frame section relative to said outer edge portion of said flange; and third adjustable alignment means operable to extend through said apertured portion of said base portion in a direction generally transverse to said surface of said mating workpiece and to abuttingly engage said surface of said mating workpiece for temporarily, fixedly aligning said C-shaped frame section and said flange secured thereto relative to said surface of said mating workpiece.

2. The apparatus of claim 1, wherein said apertured portion of said first end portion of said C-shaped frame member comprises a threaded portion; and wherein said first adjustable alignment means comprises a threaded, elongated first alignment screw having inner and outer ends, said inner end of said alignment screw being operable to extend through said apertured portion of said first end portion and threadably engage said threaded portion of said first end portion to thereby enable said first alignment screw to be controllably moved towards and away from said inner surface of said flange.

3. The tool of claim 2, further comprising an elongated handle portion coupled to said outer end portion of said first alignment screw, said elongated handle portion being operable to enable said alignment screw to be manually and threadably moved into contact with and away from said inner surface of said flange.

4. The tool of claim 1, wherein said apertured portion of said transverse section of said C-shaped frame member comprises a threaded portion; and wherein said second alignment means comprises a threaded, elongated, second alignment screw having inner and outer ends, said inner end extending through said apertured portion and threadably engaging with said threaded portion of said apertured portion to thereby enable said second alignment screw to be threadably moved into contact with and away from said outer edge portion of said flange.

5. The tool of claim 4, further comprising an elongated handle portion coupled to said outer end of said second alignment screw for enabling said second alignment screw to be manually rotatably moved into contact with and away from said outer edge portion of said flange.

6. The tool of claim 1, wherein said apertured portion of said base portion comprises a threaded portion; and wherein said third adjustable alignment means comprises a threaded, elongated, third alignment screw having inner and outer ends, said inner end threadably extending through said apertured portion of said base portion to thereby enable said third alignment screw to be threadably moved into contact with and away from said surface of said mating workpiece.

7. The tool of claim 6, further comprising an elongated handle portion coupled to said outer end of said third alignment screw to enable said third alignment screw to be manually rotatably moved into contact with and away from said surface of said mating workpiece.

8. The tool of claim 1, wherein said first alignment means includes an inner end having a tapered alignment plug coupled thereto, said tapered alignment plug being operable to help align and fixedly secure said first alignment means relative to said inner surface of said flange.

9. The tool of claim 1, wherein said second adjustable alignment means includes a semi-spherical end portion for abuttingly engaging said outer edge portion of said flange to thereby inhibit movement of said C-shaped frame member relative to said flange.

10. The tool of claim 1, further comprising a tapered alignment plug fixedly secured to said second end portion of said C-shaped frame member, said tapered alignment plug being operable to engage an outer surface of said flange to thereby help fixedly secure said C-shaped frame member to said flange.

11. The tool of claim 1, wherein said third adjustable alignment means includes an inner end having a generally flat surfaced mounting member coupled thereto, said flat surfaced mounting member being operable to abuttingly and securely engage said surface of said mating workpiece to thereby enable said C-shaped frame member to be moved towards and away from said mating workpiece.

12. A flange alignment apparatus for aligning a flange concentrically with a tubular workpiece such as a pipe, wherein said flange has inner and outer surfaces and an outer edge surface, and at least one aperture extending therethrough said inner and outer surfaces, said flange alignment apparatus comprising:

a C-shaped frame member having first and second opposing end portions, an elongated frame section therebetween transverse to said first and second end portions, and an elongated base portion, said elongated base portion extending generally transversely of said first portion and in general co-planar alignment with said first and second end portions;

said transverse frame section, said base portion and said first end portion each being threadably apertured therethrough;

said C-shaped frame member being operable to be placed over said flange whereby said first and second opposing end portions are facing and in parallel alignment with said inner and outer surfaces respectively of said flange and said elongated base portion extending generally parallel to an outer surface of said tubular workpiece;

a first adjustable, threaded, alignment screw having inner and outer end portions, said first adjustable alignment screw being operable to be screwed through said threaded aperture of said first end portion toward said inner surface of said flange and into contact with said inner surface and said aperture of said flange to thereby releasably hold said flange between said first and second opposing end portions;

a second, threaded, adjustable alignment screw having inner and outer ends, said second adjustable alignment screw being operable to threadably engage with said threaded aperture of said transverse frame section and to be screwed into contact with and away from said outer edge surface of said flange to thereby controllably fixedly secure said C-shaped frame member relative to said flange; and a third adjustable, threaded, alignment screw extending generally transversely of said base portion and said outer surface of said tubular workpiece having inner and outer ends for threadably screwing through said threaded aperture of said base portion and into contact with and away from an outer surface of said tubular workpiece, said third adjustable alignment screw thereby operating to controllably move said C-shaped frame member and said flange clamped thereto towards and away from said tubular workpiece and to hold said C-shaped frame member in a desired position relative to said tubular workpiece.

13. The apparatus of claim 12, wherein said first adjustable alignment screw includes an elongated handle portion coupled to its outer end portion to enable manual rotation thereof;

wherein said second adjustable alignment screw includes an elongated handle portion coupled to its outer end portion to enable manual rotation thereof; and wherein said third adjustable alignment screw includes an elongated handle portion coupled to its outer end portion to enable manual rotation thereof.

14. The apparatus of claim 13, wherein said inner end of said first adjustable alignment screw comprises a tapered alignment plug operable to at least partially engage said aperture of said flange to thereby help secure said first adjustable alignment screw to said flange;

wherein said inner end of said second adjustable alignment screw comprises a semi-spherical end portion operable to engage said outer edge surface of said flange to thereby fixedly secure said C-shaped frame member to said flange;

wherein said second end portion comprises a tapered alignment plug secured thereto to at least partially engage said aperture from said outer surface of said flange to thereby help secure s id C-shaped frame member to said flange; and wherein said inner end portion of said third adjustable alignment screw comprises a mounting member having a generally flat surface for helping to alignably position said C-shaped frame member and said flange clamped thereto relative to said tubular workpiece.

15. A flange alignment apparatus for temporarily aligning and holding in alignment a flange with a tubular workpiece such as a pipe to enable said flange to be secured to said pipe such as by welding or brazing, said flange alignment apparatus comprising:

a C-shaped flange alignment tool having first and second opposing end portions, a transverse frame section extending transversely between said first and second end portions and an elongated base portion, said first end portion, said transverse frame section, and said base portion each having threaded apertures therethrough, said C-shaped flange alignment tool further including a first, adjustable, threaded alignment screw for threadably engaging said apertured portion of said first end portion and abuttingly engaging an inside surface of said flange, a second, threaded alignment shaft threadably engaged with said threaded apertured portion of said transverse frame section for fixedly securing said C-shaped frame member to an outermost edge portion of said flange, and a third, adjustable, threaded alignment screw threadably engaged with said threaded apertured portion of said base portion for abuttingly engaging an outer surface of said tubular workpiece and controllably moving said C-shaped frame member towards and away from said tubular workpiece, said flange alignment tool being operable to be placed over said flange whereby said first and second opposing ends are facing and in parallel alignment with a portion of said flange;

clamping means for circumscribing said outer surface of said tubular workpiece, said clamping means including a tensioning mechanism having a protruding shoulder portion; and a level and support device for securing to a portion of said flange, said level and support device having a mounting chain for coupling with said shoulder portion of said clamping mechanism to thereby enable said flange to be fixedly, temporarily secured to said tubular workpiece, thereby enabling said flange to be aligned with said tubular workpiece by said C-shaped flange alignment tool.

16. A flange alignment tool comprising:

a C-shaped frame member having first and second opposing end portions, a frame section transverse to said first and second end portions and extending between said first and second end portions, and an elongated base portion extending generally transversely from said first end portion and in general co-planar alignment with said first end portion;

said first end portion, said transverse frame section and said base portion each being apertured therethrough;

said C-shaped frame member being operable to be placed over a flange having inner and outer surfaces and an outer edge portion, whereby said first and second opposing end portions are facing said inner and outer surfaces of said flange and said base portion is extending generally parallel to a surface of a mating workpiece;

first adjustable alignment means for extending through said apertured portion of said first end portion and engaging said inner surface of said flange and helping to align and hold said flange securely between said first and second opposing end portions of said C-shaped frame member;

second adjustable alignment means operable to extend through said apertured portion of said transverse frame section for engaging said outer edge portion of said flange and fixedly securing said transverse frame section relative to said outer edge portion of said flange; and third adjustable alignment means operable to extend through said apertured portion of said base portion in a direction generally transverse to said surface of said mating workpiece and to abuttingly engage said surface of said mating workpiece for temporarily, fixedly aligning said C-shaped frame section and said flange secured thereto relative to said surface of said mating workpiece; and wherein said first adjustable alignment means includes an inner end having a tapered alignment plug coupled thereto, said tapered alignment plug being operable to help align and fixedly secure said first adjustable alignment means relative to said surface of said inner flange.

17. A flange alignment tool comprising:

a C-shaped frame member having first and second opposing end portions, a frame section transverse to said first and second end portions and extending between said first and second end portions, and an elongated base portion extending generally transversely from said first end portion and in general co-planar alignment with said first end portion;

said first end portion, said transverse frame section and said base portion each being apertured therethrough;

said C-shaped frame member being operable to be placed over a flange having inner and outer surfaces and an outer edge portion, whereby said first and second opposing end portions are facing said inner and outer surfaces of said flange and said base portion is extending generally parallel to a surface of a mating workpiece;

first adjustable alignment means for extending through said apertured portion of said first end portion and engaging said inner surface of said flange and helping to align and hold said flange securely between said first and second opposing end portions of said C-shaped frame member;

second adjustable alignment means operable to extend through said apertured portion of said transverse frame section for engaging said outer edge portion of said flange and fixedly securing said transverse frame section relative to said outer edge portion of said flange; and third adjustable alignment means operable to extend through said apertured portion of said base portion in a direction generally transverse to said surface of said mating workpiece and to abuttingly engage said surface of said mating workpiece for temporarily, fixedly aligning said C-shaped frame section and said flange secured thereto relative to said surface of said mating workpiece; and wherein said second adjustable alignment means includes a semi-spherical end portion for abuttingly engaging said outer edge portion of said flange to thereby inhibit movement of said C-shaped frame member relative to said flange.

18. A flange alignment tool comprising:

a C-shaped frame member having first and second opposing end portions, a frame section transverse to said first and second end portions and extending between said first and second end portions, and an elongated base portion extending generally transversely from said first end portion and in general co-planar alignment with said first end portion;

said first end portion, said transverse frame section and said base portion each being apertured therethrough;

said C-shaped frame member being operable to be placed over a flange having inner and outer surfaces and an outer edge surface, whereby said first and second opposing end portions are facing said inner and outer surfaces of said flange and said base portion is extending generally parallel to a surface of a mating workpiece;

first adjustable alignment means for extending through said apertured portion of said first end portion and engaging said inner surface of said flange and helping to align and hold said flange securely between said first and second opposing end portions of said C-shaped frame member;

second adjustable alignment means operable to extend through said apertured portion of said transverse frame section for engaging said outer edge portion of said flange and fixedly securing said transverse frame section relative to said outer edge portion of said flange;

third adjustable alignment means operable to extend through said apertured portion of said base portion in a direction generally transverse to said surface of said mating workpiece and to abuttingly engage said surface of said mating workpiece for temporarily, fixedly aligning said C-shaped frame section and said flange secured thereto relative to said surface of said mating workpiece;

a tapered alignment plug fixedly secured to said second end portion of said C-shaped frame member, said tapered alignment plug being operable to engage said outer surface of said flange to thereby help fixedly secure said C-shaped frame member to said flange.

19. A flange alignment apparatus for aligning a flange concentrically with a tubular workpiece such as a pipe, wherein said flange has inner outer and outer surfaces and an outer edge surface, and at least one aperture extending through said inner and outer surfaces, said flange alignment apparatus comprising:

a C-shaped frame member having first and second opposing end portions, an elongated frame section therebetween transverse to said first and second end portions, and an elongated base portion, said elongated base portion extending generally transversely of said first end portion and in general co-planar alignment with said first and second end portions, said transverse frame section, said base portion and said first end portion each being threadably apertured therethrough, said C-shaped frame member being operable to be placed over said flange whereby said first and second opposing end portions are facing and in parallel alignment with said inner and outer surfaces respectively of said flange and said elongated base portion extending generally parallel to an outer surface of said tubular workpiece;

a first adjustable, threaded, alignment screw having inner and outer end portions, said first adjustable alignment screw being operable to be screwed through said threaded aperture of said first end portion toward said inner surface of said flange and into contact with said inner surface and said aperture of said flange to thereby releasably hold said flange between said first and second opposing end portions;

a second, threaded, adjustable alignment screw having inner and outer ends, said second adjustable alignment screw being operable to threadably engage with said threaded aperture of said transverse frame section and to be screwed into contact with and away from said outer edge surface of said flange to thereby controllably fixedly secure said C-shape frame member relative to said flange;

a third adjustable, threaded, alignment screw extending generally transversely of said base portion and said outer surface of said tubular workpiece having inner and outer ends for threadably screwing through said threaded aperture of said base portion and into contact with and away from an outer surface of said tubular workpiece, said third adjustable alignment screw thereby operating to controllably move said C-shaped frame member and said flange clamped thereto towards and away from said tubular workpiece and to hold said C-shaped frame member in a desired position relative to said tubular workpiece;

said first threaded, adjustable alignment screw including an elongated handle portion coupled to its outer end portion to enable manual rotation thereof;

said second threaded, adjustable alignment screw including an elongated handle portion coupled to its outer end portion to enable manual rotation thereof;

said third threaded, adjustable alignment screw including an elongated handle portion coupled to its outer end portion to enable manual rotation thereof;

said inner end of said first threaded, adjustable alignment screw including a tapered alignment plug operable to at least partially engage said aperture of said flange to thereby help secure said first threaded, adjustable alignment screw to said flange;

said inner end of said second threaded, adjustable alignment screw including a semi-spherical end portion operable to engage said outer edge surface of said flange to thereby fixedly secure said C-shaped frame member to said flange;

said second end portion including a tapered alignment plug secured thereto to at least partially engage said aperture from said outer surface of said flange to thereby help secure said C-shaped frame member into said flange; and said inner end portion of said third threaded, adjustable alignment screw including a mounting member having a generally flat surface for helping to alignably position said C-shaped frame member in said flange clamped thereto relative to said tubular workpiece.

* * * * *